A. J. STEWART.
Harrows.

No. 144,236.　　　　　　　　　Patented Nov. 4, 1873.

Witnesses.　　　　　　　　　Inventor.
Chas. C. Wilson　　　　　　　Adoniram J. Stewart
Dennis Tinney　　　　　　　　By. Cox & Cox Attys.

UNITED STATES PATENT OFFICE.

ADONIRAM J. STEWART, OF CHILLICOTHE, MISSOURI.

IMPROVEMENT IN HARROWS.

Specification forming part of Letters Patent No. 144,236, dated November 4, 1873; application filed July 10, 1873.

*To all whom it may concern:*

Be it known that I, ADONIRAM J. STEWART, of Chillicothe, Missouri, have made and invented a new and useful Improvement in Harrows, of which the following is a specification:

My invention relates to an improvement in harrows; and consists of a series of spring-teeth, supported in bearings in the longitudinal beam of a harrow-frame, in combination with a slide, which connects the series of teeth, the object being to provide an efficient means of adjusting the teeth to any requisite angle, by means of a rock-shaft provided with a pawl, ratchet, and lever, by which the teeth are all adjusted at one time and to the same angle.

Figure 1:
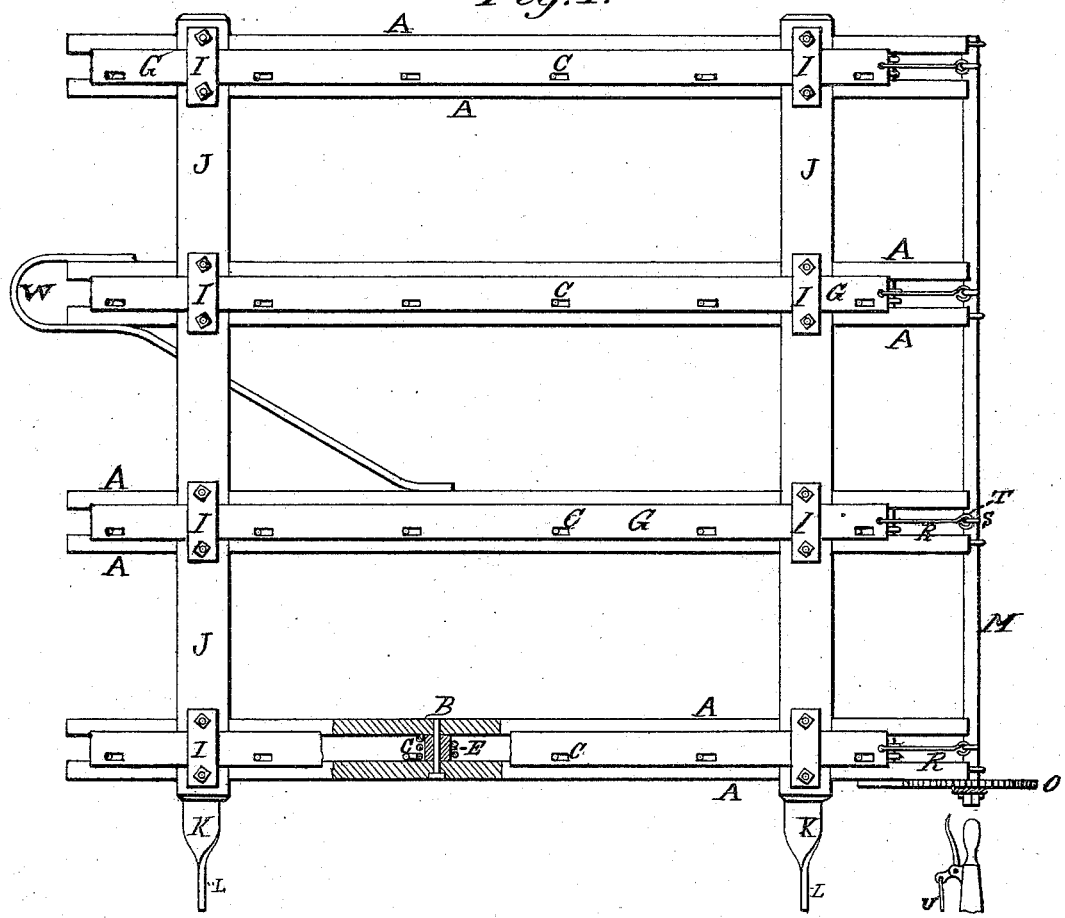
Figure 2:
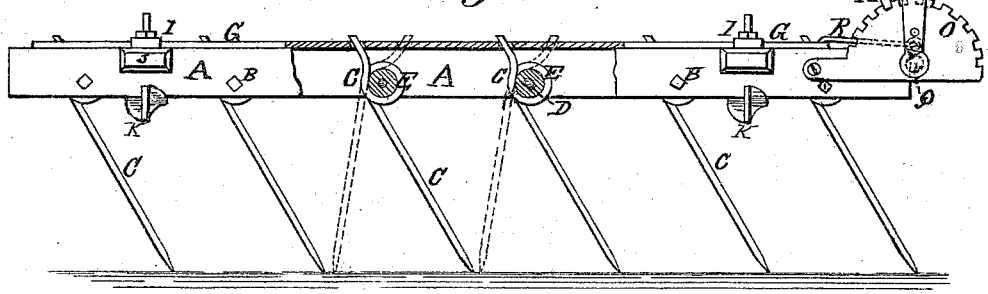

Figure 1 is a plan view of a device embodying the elements of the invention. Fig. 2 is a side elevation of same, certain parts broken out to disclose the internal arrangement.

In the accompanying drawings, the longitudinal beams of the frame are composed of two light beams, A A, between which the bearings B of the spring-teeth C are inserted. The bearings B are composed of a short shaft, D, on which a spool, E, is placed. The teeth C are of round spring-steel, coiled to encircle the bearings B, and extend both above and below the coil F. The slides G have perforations H, large enough to receive the ends of the teeth C, at a distance from each other equal to the distance between the diametrical centers of the bearings B. The slides G extend nearly the entire length of the longitudinal beams, and are sufficiently wide to cover the spaces between the beams A A. They work in the ways I secured to the cross-beams J J, which are let into the longitudinal beams. Iron straps K, twisted and provided with holes L at one end, traverse the under side of the frame beneath and parallel with cross-beams J J, and are used for coupling the sections of the harrow together. A rock-shaft, M, provided with a pawl, N, ratchet O, and lever P, traverses the rear end of the frame in suitable bearings Q, and is connected to the slides G by hooked rods R, linked to the shaft by eyes S and T. The lever P and pawl N are connected by a rod, U, provided with a spiral spring, V, which holds the pawl N in teeth of the ratchet O, except when it is manually withdrawn by the rod and lever. W is the clevis.

The operation of the harrow is as follows: When one of the teeth strikes an obstruction it will rebound and pass over the obstruction without raising the other teeth. The lever P, when drawn forward, throws the points of the teeth backward; and this operation is performed when it is desired to clear the teeth of rubbish without stopping the team. The capability of being adjusted to any desired angle adapts it to use for different kinds of work, such as pulverizing, smoothing, covering grain, or harrowing corn. To pass over a corn-row, if it should be necessary, a portion of the teeth can be withdrawn from the slide. To move it from field to field, the points of the teeth should be thrown back as far as they will go. The harrow will then pass over a road or meadow without danger to the harrow, meadow, or road.

Having thus described my invention, what I claim as new and useful, and desire to secure by Letters Patent, is—

The spring harrow-teeth C, supported on bearings in the beams A, in combination with the slides G, operated by the rock-shaft M, provided with lever P, ratchet O, and pawl N, substantially as shown and described.

In testimony that I claim the foregoing improvement in harrows, as above described, I have hereunto set my hand and seal this 23d day of June, 1873.

ADONIRAM J. STEWART. [L. S.]

Witnesses:
 A. MANDENHALL,
 JOHN J. DOSS.